United States Patent [19]

Hines

[11] 3,750,076

[45] July 31, 1973

[54] CONTROL BOXES
[75] Inventor: Burgess W. Hines, Kirkland, Ill.
[73] Assignee: Emerson Electric Co., St. Louis, Mo.
[22] Filed: Sept. 19, 1972
[21] Appl. No.: 290,396

[52] U.S. Cl.................. 337/348, 337/56, 337/91, 337/367
[51] Int. Cl. ........................................ H01h 37/70
[58] Field of Search...................... 337/56, 91, 348, 337/367, 380, 398, 399; 335/26; 200/168 G

[56] References Cited
UNITED STATES PATENTS
2,195,012  3/1940  Pierce............................. 337/56 X
3,697,714  10/1972  Gryctoko et al................ 200/168 G Primary Examiner—Bernard A. Gilheany
Assistant Examiner—F. E. Bell
Attorney—Michael Williams

[57] ABSTRACT

An enclosed control box, including a cover movably secured to the box to normally close a side thereof. The sensor of a thermostatic switch extends through an opening in a wall of the control box and senses heat within a heater housing. The switch has a reset button, and a strip of spring metal is secured within the housing and has one portion disposed adjacent to the reset button and another portion underlying an opening in the cover. The reset button is actuated when force is applied through the cover hole and against the underlying part of the spring metal strip, so that the cover need not be opened or removed to reset the switch.

9 Claims, 3 Drawing Figures

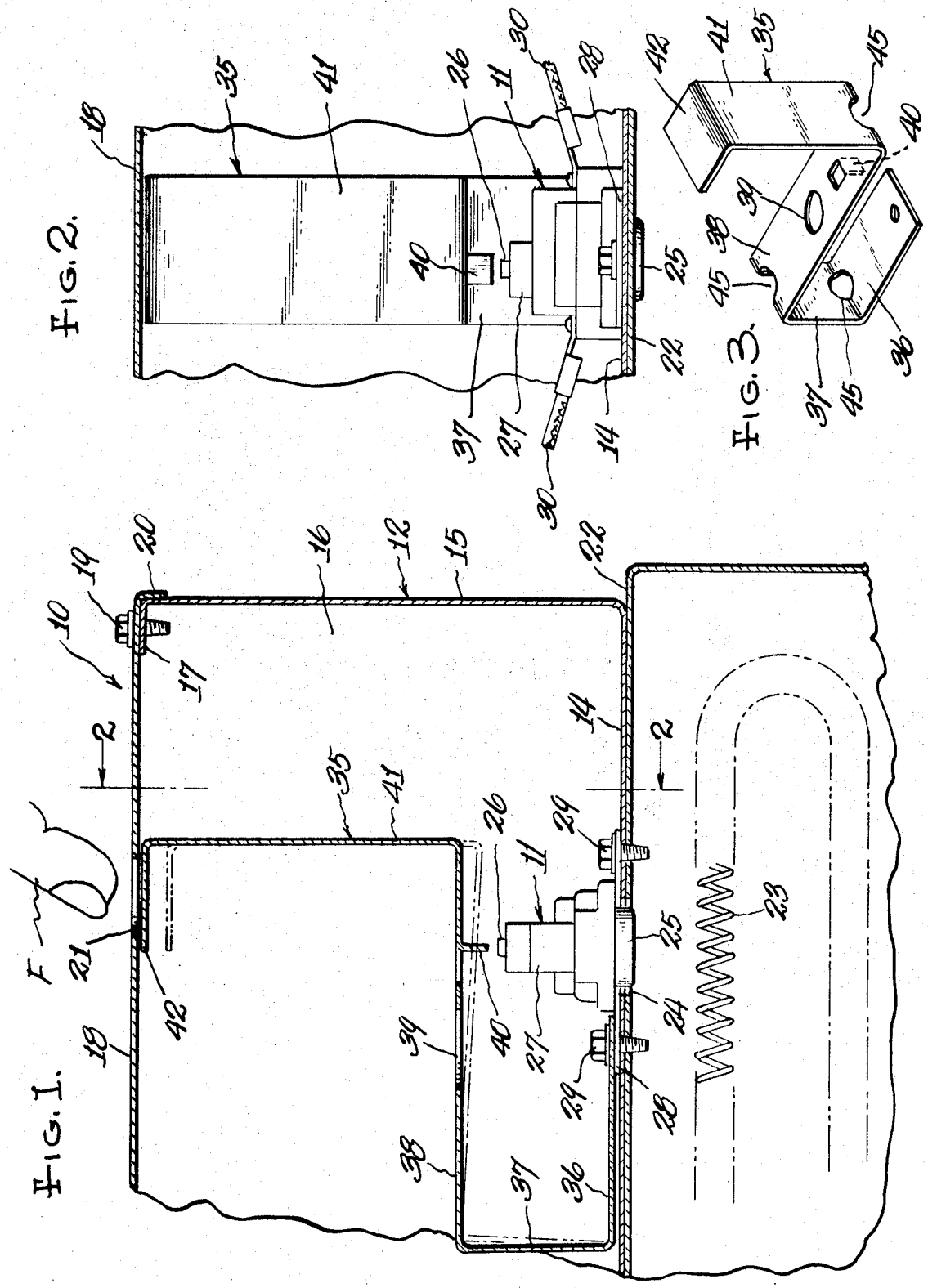

CONTROL BOXES

BACKGROUND AND SUMMARY

Certain electrical requirements relative to a control box containing electrical control components are quite stringent in order to promote safety. If the control box contains a manually resetable device, it is required that the cover be hinged to the box and provided with a latch or the equivalent, and a captive screw to reliably secure the door or cover in place.

The foregoing requirement necessitated structure and assembly which increased cost, and I have developed a control box structure that fulfills safety requirements and yet is low in cost. Briefly, my improved control box has a cover with a peripheral flange which overlaps the surface of the box around the box opening, the cover being attached to the box by a plurality of screws so that access to the box may be gained only by removing all of the screws. Totally enclosed within the box is a resilient member which has one part disposed adjacent to the reset button of a thermostatically operable switch, and another part underlying an opening in the cover opening and against the resilient part underlying the cover opening.

DESCRIPTION OF THE DRAWING

In the drawing accompanying this specification and forming a part of this application, there is shown for purpose of illustration, an embodiment which my invention may assume, and in this drawing:

FIG. 1 is a fragmentary sectional view through a control box, illustrating a preferred embodiment of my invention, FIG. 2 is a fragmentary sectional view corresponding to the line 2—2 of FIG. 1, and FIG. 3 is a perspective view of a part used in the assembly shown in FIGS. 1 and 2, drawn to a reduced scale.

DESCRIPTION OF THE PREFERRED EMBODIMENT

A control box 10 is fragmentarily shown in the drawing, and in practice the entire box and cover form a total enclosure for electrical components which may include fuses, circuit breakers and the like. In the present disclosure, only a thermostatic switch 11 is shown within the box.

The box proper is designated by the reference numeral 12 and is preferably formed of sheet metal. The box has a bottom wall 14, and end and side walls 15 and 16, forming a rectangular enclosure which is open at the top. Preferably, the upper ends of the end and side walls have inwardly extending angular flanges 17 which define the opening into the box 12.

The cover 18 is also preferably formed of sheet metal and may be movably connected to the box in any suitable manner. At the present time, it is preferred to removably connect the cover to the box by a plurality of self-threading machine screws 19 (only one being shown in the drawing), and this eliminates the cost of a hinged cover. The shank of each screw extends through an opening in the cover and is threaded into an opening in the flange 17. The cover, in accordance with electrical requirements, has a peripheral flange 20 which overlaps the surface of the box around the box opening. For a purpose to be explained later, the cover has an opening 21.

The bottom wall 14 of the box 12 is adapted to be disposed adjacent to a housing in which a heater is disposed, and as seen in FIG. 1, this wall bears against the wall 22 of a housing which may be a duct in which an electrical resistance heater 23 is disposed. The walls 14 and 22 have aligned openings 24.

The thermostatic switch 11 may be of a standard construction, and may be of a type manufactured by the Thermo-Disc Division of Emerson Electric Co. Such switch contains electrical contacts (not shown), a heat sensor 25 and a manual reset button 26. The heat sensor 25 extends through the wall openings 24 and into communication with the interior of heating duct. The dielectric casing 27 of the switch 11 is provided with a metal mounting bracket 28, and self-threading screws 29 pass through openings in the bracket and are threaded into holes in the lower wall 14. If desired, these screws may also be threaded into holes in the duct wall 22 to at least in part serve to hold the walls 14 and 22 in adjacent relation.

The electrical leads 30 extending from the switch 11 are in an electrical circuit with the heating element 23. The contacts of the switch are in set relation to establish flow of current to the heating element 23 and thus generate heat within the duct. The sensor 25 senses the heat in the duct and when a predetermined temperature is reached in the duct, the sensor functions to move the switch contacts from set position to interrupt flow of current to the heater 23. The reset button 26 may thereafter be depressed to reset the switch contacts and re-establish current flow to the heater.

Resilient means 35 carried by the control box 12, and entirely disposed within the interior thereof, is provided for depressing the reset button. The resilient means has parts respectively disposed adjacent to the cover opening 21 and the reset button 26, and is deformed from a normal condition by force applied through the cover opening and against the part thereadjacent to move the part adjacent to the reset button against the latter to reset the switch contacts. Therefore, the switch contacts may be reset with removing the cover. This desirable feature saves the expense of a hinged cover, and further eliminates the need of removing all of the screws 19.

In the disclosed embodiment, the resilient means 35 is formed of a strip of spring metal bent to S-shape. In the drawing, the strip is disposed so that the S-shape is reversed as shown, and the strip has integral portions bent at substantially right angles. Thus, referring to FIG. 1, the strip has a flat base portion 36 which may be secured to the wall 14 by one of the screws 29 (the left hand screw in FIG. 1), which holds the switch 11 to the bottom wall. A portion 37 extends upwardly from the base portion and is integrally connected to an intermediate, horizontally extending portion 38. This latter portion is formed with an opening 39 to pass a socket wrench or screw driver for tightening or loosening the left hand screw 29. A tongue is lanced out of the intermediate portion 38 and bent downwardly for cooperation with the reset button 26.

Extending upwardly from the intermediate portion 38 is a vertical portion 41 which terminates in a right angle portion 42 forming an actuator part which closely underlies the cover 18 at the cover opening 21. When force is applied through the cover opening 21 and downwardly against the actuator part 42, the spring metal strip will be deformed from its normal shape to a shape suggested by the dot-dash lines in FIG. 1, and this will depress the reset button 26 to reset the switch contacts. Any means may be used to apply force against the actuator part 42, and in FIG. 1 a person's finger F is suggested for this purpose. As seen in FIG. 3 the bends between portions 36, 37, 38 and 41 may have cut-outs 45 to insure deflection about these bends.

I claim:

1. In combination, an enclosed control box including a cover movably secured to said box to normally close a side thereof, one wall of said box being adapted to be disposed adjacent to a housing in which a heater is disposed, said one wall having an opening, a thermostatic switch mounted on said one wall and having a reset button located in the interior of said control box and a heat sensor projecting through said one wall opening and adapted to sense heat within said housing, said switch having contacts which are moved from set position upon predetermined heat sensed by said sensor to thereby inactivate said heater, and said reset button being operable to reset said switch contacts to activate said heater, an opening in said cover, and resilient means carried by said control box and disposed within the interior thereof, said resilient means having parts respectively disposed adjacent to said cover opening and to said reset button, said resilient means being deformed from a normal condition by force applied through said cover opening and against a part thereadjacent to move the part adjacent to said reset button against the latter to reset said switch contacts, whereby said switch contacts may be reset without moving said cover from its position normally closing said box side.

2. The construction according to claim 1 wherein said resilient means comprises a strip of spring metal having one end secured to said one wall, its other end underlying the opening in said cover, and an intermediate portion adjacent to but normally spaced from said reset button, but movable thereagainst when force is applied through said cover opening and against said other end of said spring metal strip.

3. In combination, an enclosed control box including a cover movably secured to said box to normally close a side thereof, one wall of said box located opposite said cover being adapted to be disposed adjacent to a housing in which a heater is disposed, said one wall having an opening, a thermostatic switch mounted on the inner surface of said one wall and having a reset button located in the interior of said control box and a heat sensor projecting through said one wall opening and adapted to sense heat within said housing, said switch having contacts which are moved from set position upon predetermined heat sensed by said sensor to thereby inactivate said heater, and said reset button being operable to reset said switch contacts to activate said heater, an opening in said cover, and resilient means carried by said control box and fully disposed therewithin, said resilient means having a part underlying said cover opening and another part adjacent to said reset button, said resilient means being deformed from a normal condition by force applied through said cover opening and against said underlying part to move said other part against said reset button to reset said switch contacts, whereby said switch contacts may be reset without moving said cover from its position normally closing said box side.

4. The construction according to claim 3 wherein said resilient means comprises a strip of spring metal having one end secured to said one wall, its other end underlying the opening in said cover, and an intermediate portion adjacent to but normally spaced from said reset button, but movable thereagainst when force is applied through said cover opening and against said other end of said spring metal strip.

5. The construction according to claim 4 wherein said spring metal strip is S-shaped.

6. The construction according to claim 4 wherein a fastening device passes through aligned openings in said one end of said spring metal strip and a mounting flange of said thermostatic switch to hold both secured to said control box one wall.

7. The construction according to claim 6 wherein said fastening device is a sheet metal screw and wherein the intermediate portion of said spring metal strip has an opening for passing a screw moving device.

8. The construction according to claim 3 wherein said cover has a peripheral flange which overlaps the surface of the box around the box opening, and said cover is secured to said box by a plurality of screws.

9. The construction according to claim 4 wherein a tongue is lanced from said intermediate portion and is bent downwardly for cooperation with said reset button.

* * * * *